(12) United States Patent
Adiththan et al.

(10) Patent No.: US 12,223,841 B2
(45) Date of Patent: Feb. 11, 2025

(54) SYSTEM AMD METHOD FOR PROVIDING A RIDE ASSISTANT FOR ON-DEMAND AUTONOMY

(71) Applicant: GM GLOBAL TECHNOLOGY OPERATIONS LLC, Detroit, MI (US)

(72) Inventors: Arun Adiththan, Sterling Heights, MI (US); Prakash Mohan Peranandam, Rochester Hills, MI (US); Ramesh Sethu, Troy, MI (US)

( * ) Notice: Subject to any disclaimer, the term of this patent is extended or adjusted under 35 U.S.C. 154(b) by 409 days.

(21) Appl. No.: 17/447,132

(22) Filed: Sep. 8, 2021

(65) Prior Publication Data
US 2023/0074015 A1 Mar. 9, 2023

(51) Int. Cl.
*G08G 1/00* (2006.01)
*B60W 30/14* (2006.01)
(Continued)

(52) U.S. Cl.
CPC .............. *G08G 1/22* (2013.01); *B60W 30/14* (2013.01); *B60W 60/0027* (2020.02); *H04L 67/10* (2013.01); *H04W 4/46* (2018.02)

(58) Field of Classification Search
CPC ........... G08G 1/22; G08G 1/205; G08G 1/20; B60W 30/14; B60W 60/0027;
(Continued)

(56) References Cited

U.S. PATENT DOCUMENTS 10,440,668 B1 * 10/2019 Wu .................. H04W 4/46
2017/0293296 A1 * 10/2017 Stenneth .......... G06Q 10/06315
(Continued)

FOREIGN PATENT DOCUMENTS

EP 3614355 A1 * 2/2020

OTHER PUBLICATIONS

U. Montanaro, S. Fallah, M. Dianati, D. Oxtoby, T. Mizutani and A. Mouzakitis, "Cloud-Assisted Distributed Control System Architecture for Platooning," 2018 21st International Conference on Intelligent Transportation Systems (ITSC), Maui, HI, USA, 2018, pp. 1258-1265, doi: 10.1109/ITSC.2018.8569295. (Year: 2018).*
(Continued)

*Primary Examiner* — Anne Marie Antonucci
*Assistant Examiner* — Jordan T Smith
(74) *Attorney, Agent, or Firm* — Lorenz & Kopf, LLP

(57) ABSTRACT

A method in an On-Demand Autonomy system includes: monitoring for a trip change request from a plurality of platoon vehicles including a first leader vehicle (Lv) and a follower vehicle (Fv). When a trip termination request is received from a platoon vehicle, the method includes broadcasting information regarding the request to the other platoon vehicles, and monitoring for an acknowledgement of the request. When the trip termination request originated from the first Lv, the method includes electing a new Lv, computing a rendezvous point for the new Lv and the Fv, and signaling the Fv and new Lv regarding the rendezvous point. When a trip modification request is received from the Fv, the method includes broadcasting information regarding the request to the first Lv, electing a new Lv, computing a rendezvous point for the new Lv and the Fv, and signaling the Fv and new Lv regarding the rendezvous point.

20 Claims, 6 Drawing Sheets

(51) Int. Cl.
    *B60W 60/00*     (2020.01)
    *H04L 67/10*     (2022.01)
    *H04W 4/46*      (2018.01)

(58) Field of Classification Search
    CPC .......... H04L 67/10; H04L 67/12; H04W 4/46;
                  H04W 4/44; G07C 5/008; G07C 5/02
    See application file for complete search history.

(56) References Cited

U.S. PATENT DOCUMENTS

| | | | | |
|---|---|---|---|---|
| 2017/0344023 | A1* | 11/2017 | Laubinger | B60W 30/165 |
| 2020/0125117 | A1* | 4/2020 | Switkes | H04W 4/029 |
| 2020/0201356 | A1* | 6/2020 | Schuh | B60W 30/165 |
| 2022/0108618 | A1* | 4/2022 | Kumar | H04W 48/04 |

OTHER PUBLICATIONS

O. Sawade, M. Schulze and I. Radusch, "Robust Communication for Cooperative Driving Maneuvers," in IEEE Intelligent Transportation Systems Magazine, vol. 10, No. 3, pp. 159-169, Fall 2018, doi: 10.1109/MITS.2018.2842241. (Year: 2018).*

* cited by examiner

SYSTEM AMD METHOD FOR PROVIDING A RIDE ASSISTANT FOR ON-DEMAND AUTONOMY

TECHNICAL FIELD

The technology described in this patent document relates generally to an On-Demand Autonomy (ODA) service for semi-autonomous/autonomous vehicles and more particularly to communication between entities in an ODA service.

An autonomous vehicle is a vehicle that can sense its environment and navigating with little or no user input. An autonomous vehicle senses its environment using sensing devices such as radar, lidar, image sensors, and the like. The autonomous vehicle system further uses information from a positioning system including global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. There may be situations where a vehicle could benefit from autonomous driving capabilities but is not equipped with all the necessary components to allow for fully autonomous driving experience.

Accordingly, it is desirable to provide systems and methods for an On-Demand Autonomy (ODA) service that extends on-demand autonomy to vehicles that are not built for full autonomy. Furthermore, other desirable features and characteristics will become apparent from the subsequent detailed description and the appended claims, taken in conjunction with the accompanying drawings.

SUMMARY

Systems and methods for an On-Demand Autonomy (ODA) service are provided. In one embodiment, a cloud-based server (ODAS) for facilitating platooning services in an On-Demand Autonomy (ODA) system including a follower vehicle (Fv), a leader vehicle (Lv), and the ODAS is provided. The ODAS includes a controller for supporting ODA platooning. The controller includes non-transitory computer readable media and one or more processors configured by programming instructions on the non-transitory computer readable media to: monitor for a trip change request including a trip termination request or a trip modification request from a plurality of platoon vehicles including a first Lv and the Fv in a platooning trip; when a trip termination request is received from one of the first Lv or the Fv, broadcast information regarding the trip termination request to the other of the first Lv or the Fv, and monitor for an acknowledgement and acceptance of the trip termination request from the other of the first Lv and the Fv; when the trip termination request originated from the first Lv, elect a new Lv, compute a rendezvous point for the new Lv and the Fv, and signal the Fv and new Lv that the new Lv will take over as the leader for the platooning trip at the rendezvous point; when a trip modification request is received from the Fv, broadcast information regarding the trip modification request to the first Lv, monitor for Lv acknowledgement of the trip modification request, elect a new Lv, compute a rendezvous point for the new Lv and the Fv, and signal the Fv and new Lv that the new Lv will take over as the leader for the platooning trip at the rendezvous point; and monitor each of the plurality of platoon vehicles for an acknowledgement that indicates acceptance of the new Lv as the leader for the platooning trip at the rendezvous point when the new Lv has been elected.

In one embodiment, the controller is further configured to provide decoupling instructions for the Fv and first Lv when the request is for trip cancelation and not a modification.

In one embodiment, the controller is further configured to provide decoupling instructions for the Fv and first Lv and coupling instructions for the Fv and the new Lv when the request is for trip cancelation or a modification requiring the new Lv.

In one embodiment, the controller is further configured to continue to monitor the platooning trip when the Fv and the new Lv acknowledge acceptance of the coupling instructions.

In one embodiment, the controller is further configured to discontinue monitoring the platooning trip when the Fv and the new Lv acknowledge non-acceptance of the coupling instructions.

In one embodiment, the controller is further configured to: monitor for periodic heartbeat messages from the plurality of platoon vehicles; when a periodic heartbeat message is received, compute a first result that indicates whether a fault has occurred with the platoon vehicle that sent the heartbeat message and when a fault has occurred diagnose the type of fault that has occurred; and when the type of fault has been diagnosed, select a feedback mechanism (e.g., voice, text, non-verbal cue such as haptic) and signal using the selected feedback mechanism the Fv and the Lv with an alert message that identifies the diagnosed type of fault.

In one embodiment, the controller is further configured to monitor for a subsequent periodic heartbeat message from each of the plurality of platoon vehicles that acknowledges receipt of the alert message that identifies the diagnosed type of fault.

In one embodiment, the controller is further configured to: when a periodic heartbeat message is not received from one of the plurality of platoon vehicles, query the platoon vehicle from which the periodic heartbeat message was not received regarding vehicle health status and virtual coupling health status; select a feedback mechanism (voice, text, non-verbal cue such as haptic) and signal using the selected feedback mechanism to the other of the plurality of platoon vehicles an alert message that provides notification that the periodic heartbeat message was not received; and when a responsive message to the query is received, signal the other of the plurality of platoon vehicles with status information regarding the platoon vehicle from which the periodic heartbeat message was not received.

In one embodiment, the controller is further configured to: when a safety alert message (e.g., from in-vehicle occupant or remote user via a host ride assistant, vehicle) regarding the Fv is received (e.g., via app or infotainment system), request further information from a message sender; when further information is received, calculate a second result including a safety event response (e.g., call 911 if appropriate, pullover for physical inspection, etc.), cause the safety response to occur, and signal the Lv that a safety alert message was received and to adjust driving accordingly (e.g., notification to operate conservatively or to pull over); monitor for an acknowledgement from the Lv after signaling the Lv that a safety alert message was received; broadcast an alert (voice/text) regarding the safety event response to the Fv (and in-vehicle occupant, remote user); and monitor for an acknowledgement from the Fv.

In another embodiment, a method in an On-Demand Autonomy (ODA) system including a follower vehicle (Fv) and a leader vehicle (Lv) is provided. The method includes: monitoring for a trip change request including a trip termination request or a trip modification request from a plurality of platoon vehicles including a first Lv and the Fv in a platooning trip; when a trip termination request is received from one of the first Lv or the Fv, broadcasting information regarding the trip termination request to the other of the first Lv or the Fv, and monitoring for an acknowledgement and acceptance of the trip termination request from the other of the first Lv and the Fv; when the trip termination request originated from the first Lv, electing a new Lv, computing a rendezvous point for the new Lv and the Fv, and signaling the Fv and new Lv that the new Lv will take over as the leader for the platooning trip at the rendezvous point; when a trip modification request is received from the Fv, broadcasting information regarding the trip modification request to the first Lv, monitoring for Lv acknowledgement of the trip modification request, electing a new Lv, computing a rendezvous point for the new Lv and the Fv, and signaling the Fv and new Lv that the new Lv will take over as the leader for the platooning trip at the rendezvous point; and monitoring each of the plurality of platoon vehicles for an acknowledgement that indicates acceptance of the new Lv as the leader for the platooning trip at the rendezvous point when the new Lv has been elected.

In another embodiment, the method further includes providing decoupling instructions for the Fv and first Lv when the request is for trip cancelation and not a modification.

In another embodiment, the method further includes providing decoupling instructions for the Fv and first Lv and coupling instructions for the Fv and the new Lv when the request is for trip cancelation or a modification requiring the new Lv.

In another embodiment, the method further includes continuing to monitor the platooning trip when the Fv and the new Lv acknowledge acceptance of the coupling instructions, and discontinuing monitoring the platooning trip when the Fv and the new Lv acknowledge non-acceptance of the coupling instructions.

In another embodiment, the method further includes: monitoring for periodic heartbeat messages from the plurality of platoon vehicles; when a periodic heartbeat message is received, computing a first result that indicates whether a fault has occurred with the platoon vehicle that sent the heartbeat message and when a fault has occurred diagnose the type of fault that has occurred; and when the type of fault has been diagnosed, selecting a feedback mechanism (voice, text, non-verbal cue such as haptic) and signal using the selected feedback mechanism the Fv and the Lv with an alert message that identifies the diagnosed type of fault.

In another embodiment, the method further includes monitoring for a subsequent periodic heartbeat message from each of the plurality of platoon vehicles that acknowledges receipt of the alert message that identifies the diagnosed type of fault.

In another embodiment, the method further includes: when a periodic heartbeat message is not received from one of the plurality of platoon vehicles, querying the platoon vehicle from which the periodic heartbeat message was not received regarding vehicle health status and virtual coupling health status; selecting a feedback mechanism (voice, text, non-verbal cue such as haptic) and signaling using the selected feedback mechanism to the other of the plurality of platoon vehicles an alert message that provides notification that the periodic heartbeat message was not received; and when a responsive message to the querying is received, signaling the other of the plurality of platoon vehicles with status information regarding the platoon vehicle from which the periodic heartbeat message was not received.

In another embodiment, the method further includes: when a safety alert message (e.g., from in-vehicle occupant or remote user via a host ride assistant, vehicle) regarding the Fv is received (e.g., via app or infotainment system), requesting further information from a message sender; when further information is received, calculating a second result including a safety event response (e.g., call 911 if appropriate, pullover for physical inspection, etc.), causing the safety response to occur, and signaling the Lv that a safety alert message was received and to adjust driving accordingly (e.g., notification to operate conservatively or to pull over); monitoring for an acknowledgement from the Lv after signaling the Lv that a safety alert message was received; broadcasting an alert (voice/text) regarding the safety event response to the Fv (and in-vehicle occupant, remote user); and monitoring for an acknowledgement from the Fv.

In another embodiment, non-transitory computer readable media encoded with programming instructions configurable to cause one or more processors in an On-Demand Autonomy (ODA) system including a follower vehicle (Fv) and a leader vehicle (Lv) to perform a method is provided. The method includes: monitoring for a trip change request including a trip termination request or a trip modification request from a plurality of platoon vehicles including a first Lv and the Fv in a platooning trip; when a trip termination request is received from one of the first Lv or the Fv, broadcasting information regarding the trip termination request to the other of the first Lv or the Fv, and monitoring for an acknowledgement and acceptance of the trip termination request from the other of the first Lv and the Fv; when the trip termination request originated from the first Lv, electing a new Lv, computing a rendezvous point for the new Lv and the Fv, and signaling the Fv and new Lv that the new Lv will take over as the leader for the platooning trip at the rendezvous point; when a trip modification request is received from the Fv, broadcasting information regarding the trip modification request to the first Lv, monitoring for Lv acknowledgement of the trip modification request, electing a new Lv, computing a rendezvous point for the new Lv and the Fv, and signaling the Fv and new Lv that the new Lv will take over as the leader for the platooning trip at the rendezvous point; and monitoring each of the plurality of platoon vehicles for an acknowledgement that indicates acceptance of the new Lv as the leader for the platooning trip at the rendezvous point when the new Lv has been elected.

In one embodiment, the method further includes providing decoupling instructions for the Fv and first Lv when the request is for trip cancelation and not a modification.

In one embodiment, the method further includes providing decoupling instructions for the Fv and first Lv and coupling instructions for the Fv and the new Lv when the request is for trip cancelation or a modification requiring the new Lv.

In one embodiment, the method further includes continuing to monitor the platooning trip when the Fv and the new Lv acknowledge acceptance of the coupling instructions, and discontinuing monitoring the platooning trip when the Fv and the new Lv acknowledge non-acceptance of the coupling instructions.

In one embodiment, the method further includes: monitoring for periodic heartbeat messages from the plurality of platoon vehicles; when a periodic heartbeat message is received, computing a first result that indicates whether a fault has occurred with the platoon vehicle that sent the heartbeat message and when a fault has occurred diagnose the type of fault that has occurred; and when the type of fault has been diagnosed, selecting a feedback mechanism (voice, text, non-verbal cue such as haptic) and signal using the selected feedback mechanism the Fv and the Lv with an alert message that identifies the diagnosed type of fault.

In one embodiment, the method further includes monitoring for a subsequent periodic heartbeat message from each of the plurality of platoon vehicles that acknowledges receipt of the alert message that identifies the diagnosed type of fault.

In one embodiment, the method further includes: when a periodic heartbeat message is not received from one of the plurality of platoon vehicles, querying the platoon vehicle from which the periodic heartbeat message was not received regarding vehicle health status and virtual coupling health status; selecting a feedback mechanism (voice, text, non-verbal cue such as haptic) and signaling using the selected feedback mechanism to the other of the plurality of platoon vehicles an alert message that provides notification that the periodic heartbeat message was not received; and when a responsive message to the querying is received, signaling the other of the plurality of platoon vehicles with status information regarding the platoon vehicle from which the periodic heartbeat message was not received.

In one embodiment, the method further includes: when a safety alert message (e.g., from in-vehicle occupant or remote user via a host ride assistant, vehicle) regarding the Fv is received (e.g., via app or infotainment system), requesting further information from a message sender; when further information is received, calculating a second result including a safety event response (e.g., call 911 if appropriate, pullover for physical inspection, etc.), causing the safety response to occur, and signaling the Lv that a safety alert message was received and to adjust driving accordingly (e.g., notification to operate conservatively or to pull over); monitoring for an acknowledgement from the Lv after signaling the Lv that a safety alert message was received; broadcasting an alert (voice/text) regarding the safety event response to the Fv (and in-vehicle occupant, remote user); and monitoring for an acknowledgement from the Fv.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
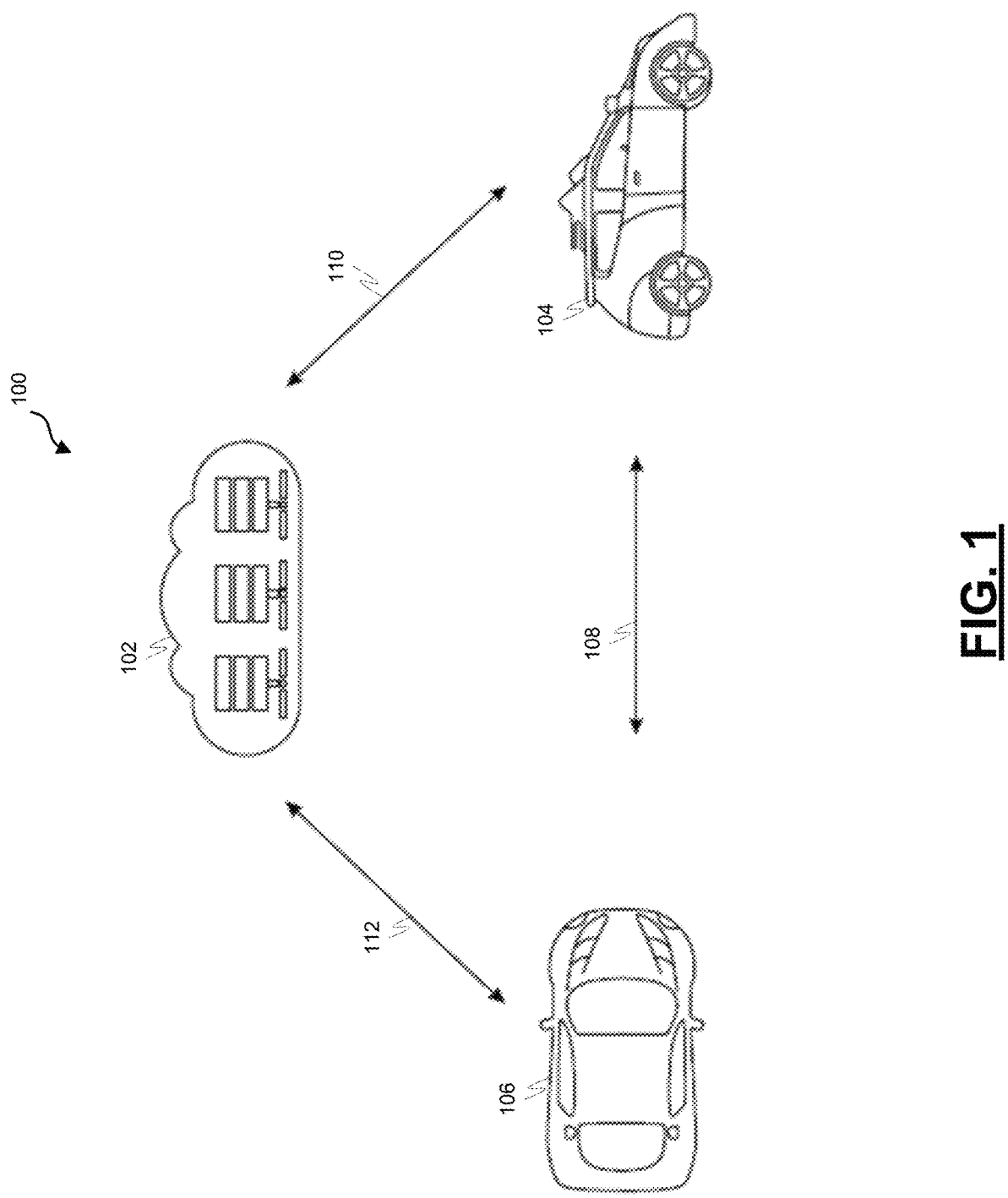
FIG. 1 is a block diagram depicting an example On-Demand Autonomy (ODA) system for providing ODA services, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for an On-Demand Autonomy (ODA) system that incorporates an onboard/offboard Ride Assistant human machine interface (HMI) system. The Ride Assistant system may enable a mechanism to select and rate leader(s)/follower(s) at the beginning and end of trips; allow for follower or leader or authorized person initiated ongoing trip interrupts, such as modifications (e.g., pit stop) or terminations, via a mobile application (offboard) or infotainment system (onboard) or visual gestures. The following disclosure describes apparatus, systems, techniques, and articles for enhancing user safety by leveraging in-vehicle monitoring (e.g., cabin camera, external camera) and communication systems. The following disclosure describes apparatus, systems, techniques, and articles for providing a robust feedback system (e.g., using display/haptic/voice/gestures/alert sounds) that can be tapped to communicate with users in requesting vehicle or leader vehicle at various stages of service provisioning such as initiation, active, hand-off, and termination. The following disclosure describes apparatus, systems, techniques, and articles for accepting leader(s)/follower(s) based on ratings, leaving a rating based on comfort and safety at the end of the trip.

FIG. 1 is a block diagram depicting an example On-Demand Autonomy (ODA) system 100 for providing ODA services. The example ODA system 100 includes an On-Demand Autonomy server (ODAS) 102, one or more leader vehicles (Lv) 104, and one or more follower vehicles (Fv) 106. The ODA system 100 is configured to implement a platooning service wherein a group of vehicles (including the one or more leader vehicles 104 and the one or more follower vehicles 106) are driven together in a platoon. In a platoon, the distances between vehicles (e.g., cars or trucks) can be reduced using a virtual coupling 108 (e.g., electronic coupling) between leader and follower vehicles. The virtual coupling 108 allows future vehicle maneuvers to be communicated ahead of time to allow the platooned vehicles to accelerate or brake simultaneously. The virtual coupling 108 can also allow for a closer headway between vehicles while traveling as a platoon by reducing or eliminating reacting distance since future vehicle maneuvers are known ahead of time. In the ODA system 100, the Lv 104 is communicatively coupled to the ODAS 102 via a communication link 110, and the Fv 106 is communicatively coupled to the ODAS 102 via a communication link 112. Through the communication links 110, 112, the ODAS 102 can facilitate setup of platooning trip between a Lv 104 and a Fv 106, monitor the Lv 104 and the Fv 106 during the platooning trip, communicate status information regarding the platooned vehicles 104, 106 to each other, communicate platoon termination requests between the platooned vehicles 104, 106, and communicate safety information between the platooned vehicles 104, 106.

The virtual coupling 108 and communication links 110, 112, may be implemented using a wireless carrier system such as a cellular telephone system and/or a satellite communication system. The wireless carrier system can implement any suitable communications technology, including, for example, digital technologies such as CDMA (e.g., CDMA2000), LTE (e.g., 4G LTE or 5G LTE), GSM/GPRS, or other current or emerging wireless technologies.

The communication links 110, 112, may also be implemented using a conventional land-based telecommunications network coupled to the wireless carrier system. For example, the land communication system may include a public switched telephone network (PSTN) such as that used to provide hardwired telephony, packet-switched data communications, and the Internet infrastructure. One or more segments of the land communication system can be implemented using a standard wired network, a fiber or other optical network, a cable network, power lines, other wireless networks such as wireless local area networks (WLANs), or networks providing broadband wireless access (BWA), or any combination thereof.

In one example implementation, Lv 104 comprises an autonomous vehicle that is configured as a leader vehicle. In this example, the Lv includes a processor in communication with an ODAS configured to: determine whether to confirm a request for an on-demand autonomy ODA service which is received via a broadcast by the ODAS to a set of Lvs wherein the ODA service request includes navigation and control of an Fv to a requested location by creating a virtual link between the Lv and the Fv to configure a vehicle platoon to enable transport of the Fv by the Lv wherein the vehicle platoon is a linking of the Lv to the Fv via the virtual link to enable the Lv to assume control of the Fv, and to navigate the Fv to the requested location; process information broadcast from the ODA server wherein the information broadcast occurs via a distribution protocol to solicit multiple responses from the set of Lvs to create the virtual link between the Lv and Fv wherein each Lv of the set of Lvs independently makes a decision whether to confirm the ODA service request and to create the virtual link with the Fv; determine a value score independently by the Lv based on the information broadcast that provides a cost metric of an amount provided by the ODA service for the Lv to perform an operation of navigating and the control of the Fv to the requested location wherein the value score is based on a set of factors associated directly with operation of the Lv to the ODA service request; and decide whether in a first instance, confirm acceptance of the ODA service request and enable the virtual link to navigate and the control by the Fv of the Lv in the vehicle platoon to the requested location, and in a second instance, continue to monitor the information broadcast from the ODA server to wait for another ODA service request.

In one example implementation, Fv 106 comprises an autonomous or semiautonomous vehicle that includes a processor in communication with an ODAS. In this example, the processor is configured to enable the Fv to establish a virtual link in a platoon with an Lv wherein the virtual link enables the Fv to simulate vehicle operations of a high level of autonomous driving capability without the Fv being configured for the high level of autonomous driving capability.

In one example implementation, ODAS 102 includes a processor in communication with a first vehicle and at least one second vehicle. In this example, the processor responsive to receiving a trip request for ODA service from the first vehicle is configured to seek an agreement to establish a virtual link between the first vehicle and the at least one second vehicle. To seek an agreement, the processor is configured to: broadcast the trip request to a group of second vehicles; receive a set of responses submitted by one or more second vehicles to the broadcast trip request; identify at least one second vehicle as an Lv from the submitted responses from the group of second vehicles based on a matching operation; coordinate one or more responses between the first and second vehicles based on results of the matching operation to confirm an acceptance of the agreement; and in response to confirmation of the acceptance of the agreement, create a trip plan for the trip request for the ODA service based on a set of preferences received from each of the vehicles.

Figure 2:
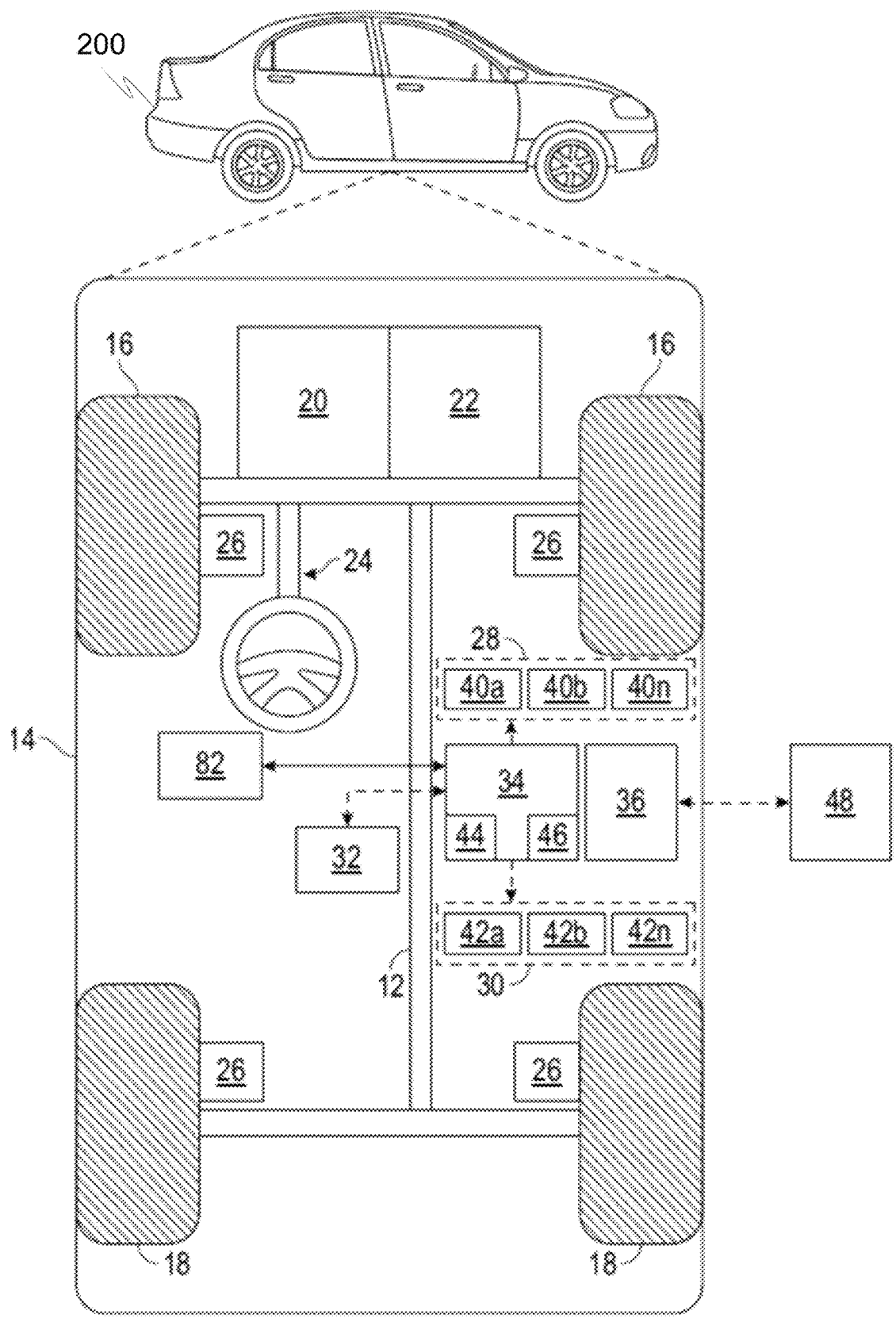
FIG. 2 is a block diagram depicting an example vehicle that may be used in the example ODA system as a leader vehicle or follower vehicle, in accordance with various embodiments.

FIG. 2 is a block diagram depicting an example vehicle 200 that may be used in the example ODA system as a leader vehicle or follower vehicle. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including trucks, sport utility vehicles (SUVs), recreational vehicles (RVs), etc., may also be used. The vehicle 200 may be capable of being driven manually, autonomously and/or semi-autonomously.

The vehicle 200, in this example, is an autonomous vehicle. The example autonomous vehicle 200 may include a so-called Level Two, Two plus, Three, Four, or Level Five automation system. A level Two or Two plus system indicates a system that has capabilities to create and confirm a virtual link and enable an Lv to control the Fv to a requested location where the Fv has relinquished control of vehicle operation to the Lv.

A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

The vehicle 200 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40n that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 200 to receive and accept requests from a remote cloud ODA server, process instructions, provide various decision-making responses, monitor for broadcast messages associated with a virtually made vehicle leader or follower configuration, and provide status information for an ODA service.

The ODA system 100 can allow a host vehicle 106 that may have various levels of autonomous driving capabilities to follow a lead vehicle 104, such as a Robo Taxi, that may have various levels of autonomous driving capabilities from one destination to another. The occupants of the host vehicle 106 may include a human driver who operates the host vehicle 106 during certain portions of a trip. Similarly, the lead vehicle 104 may include a human driver who operates the lead vehicle 104 doing certain portions of a trip.

In one example operating scenario, a platoon of vehicles consisting of one Lv configured to guide one or more Fvs from one point to another may be formed. In this operating scenario the ODA server 102 may select one or more Fvs 106 and command the Fvs 106 to follow a selected one of multiple Lvs 104 in a vehicle platoon for navigation, guidance, and instruction for dropping off one or more of the Fvs 106 at various designated points. The ODA server 102 may perform operations to initiate a trip and cause a virtual coupling between the Lv and Fv.

The ODA server 102 may use a decision-making intelligent algorithm to elect a leader for a leg of a trip, which consists of a Robo Taxi. The ODA server 102 may select a leader based on multiple inputs that may include the current state of the vehicle, route of the vehicle, weather, passenger preference, follower pick-up/drop-off locations, and history, etc. The ODA server 102 identifies a rendezvous and communicates trip details to the host vehicle and leader vehicle to execute a trip.

In one example operating scenario, a driver of a vehicle may request assistance to a location without requiring the driver to perform driver operations. In another example operating scenario, the driver of the vehicle may desire a more autonomous driving experience and may be willing to relinquish vehicle control for a route segment or entire route to an Lv. In either example scenario, the vehicle may be configured with Level 2 plus capabilities that provide limited autonomous vehicle operations yet have communication capabilities to make requests for an on-demand service and to enable a virtual link with an Lv where the Lv can be given sufficient operational control via the virtual link to virtually tow the vehicle to a desired location without the driver of the vehicle having to operate the vehicle.

In these example scenarios, an Fv can be virtually towed in a platoon configuration with an Lv thereby enabling an autonomous driving experience (e.g., a level 4 or 5 autonomous driving experience) without the Fv being configured or having level 4 or 5 autonomous driving capabilities. That is, by creating a virtual link between the Lv and Fv, the Fv can operate in a semi or nearly autonomous manner by reliance on the control operations provided by the Lv. By relying on the Lv for control and navigation to the requested location, the Fv can simulate an autonomous driving experience without being configured with the necessary software, hardware, and control system for level 4 or 5 autonomous driving capabilities.

Various conditions may arise that may necessitate changes be made to a platooning trip, after the platooning tip has been initiated. The example ODAS 102 is configured to handle the conditions that can cause a modification to a platooning trip, after the platooning trip has been initiated.

Figure 3:
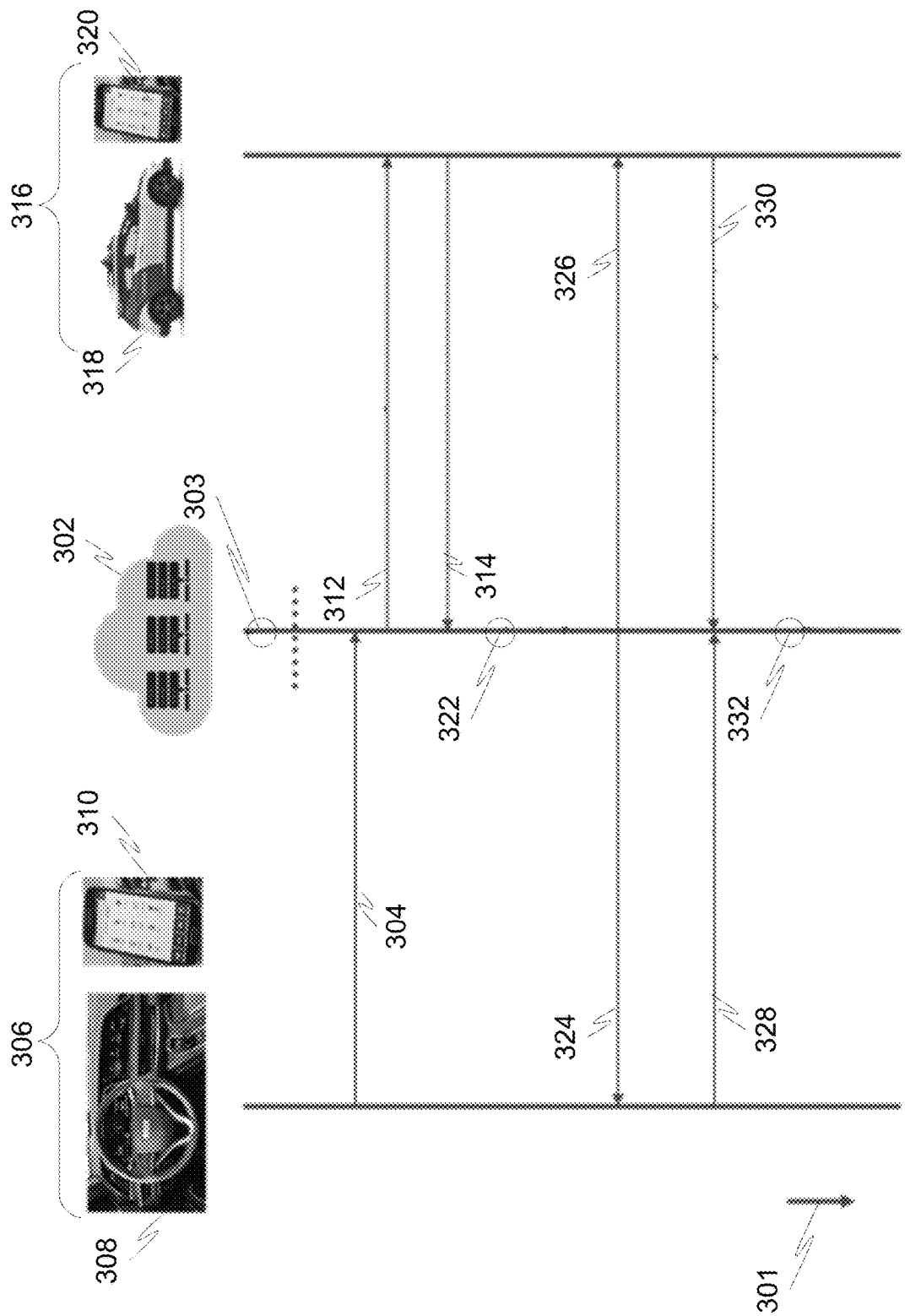
FIG. 3 is a diagram depicting an example timing chart illustrating example interactions between an ODA server, a host vehicle, and a Robo Taxi resulting from a requested change by an occupant of the host vehicle after the beginning of a platooning trip, in accordance with various embodiments.

FIG. 3 is a diagram of an example timing chart illustrating example interactions over time 301 between an ODA server 302, a host vehicle or Fv, and a Robo Taxi or Lv resulting from a requested change by an occupant of the Fv after the beginning 303 of a platooning trip. In this example, an occupant of the Fv sends a trip modification or termination request to the ODAS 302 (operation 304) via a host ride assistant 306. The host ride assistant 306 may be embodied in a vehicle human machine interface (HMI) 308 in the host vehicle (e.g., an infotainment system in a host vehicle) or a mobile app 310 on a user device.

The ODAS 302 broadcasts the information content of the request to current and future trip leaders (Lvs) for the platooning trip (operation 312) notifying them of the requested trip modification. The Lvs acknowledge and accept the request (operation 314). The trip modification may then be implemented. The Lvs may acknowledge the request via Robo Taxi ride assistant 316 in the case of an Lv containing a human driver or occupant or may acknowledge the request via a built in ODS system module in the case of a human less vehicle. The Robo Taxi ride assistant 316 may be embodied in a vehicle human machine interface (HMI) 318 in the Robo Taxi vehicle (e.g., an infotainment system in a Robo Taxi vehicle) or a mobile app 320 on a user device.

When the request is for a trip modification in which the current Robo Taxi will no longer function as a leader vehicle, the ODAS 302 will elect a new leader and compute new rendezvous points, if necessary (operation 322). The ODAS 302 will subsequently communicate revised coupling/decoupling information to the host vehicle (operation 324) and to the Robo Taxi (operation 326). When the request is for trip cancelation or a modification in which the current Robo Taxi will no longer function as a leader vehicle, the subsequent communication will include decoupling instructions for the Fv and current Lv and coupling instructions for the Fv and a new Lv. When the request is for a trip cancelation and not a modification, the ODAS 302 will subsequently communicate revised decoupling information to the host vehicle (operation 324) and to the Robo Taxi (operation 326).

After receipt of the subsequent communication, the host vehicle will transmit an acknowledgment accepting or rejecting the coupling/decoupling instructions in the subsequent communication (operation 328), and the newly elected Robo Taxi will transmit an acknowledgment accepting or rejecting the coupling/decoupling instructions in the subsequent communication (operation 330). The ODAS 302 will monitor the trip if the host vehicle and newly elected Robo Taxi accept the coupling instructions or terminate the trip if the host vehicle and newly elected Robo Taxi reject the coupling instructions (operation 332).

FIG. 3 provides an example wherein an occupant in the host vehicle requests a trip modification or termination. There may also be instances wherein the current Robo Taxi requests that its participation in the trip be terminated.

Figure 4:
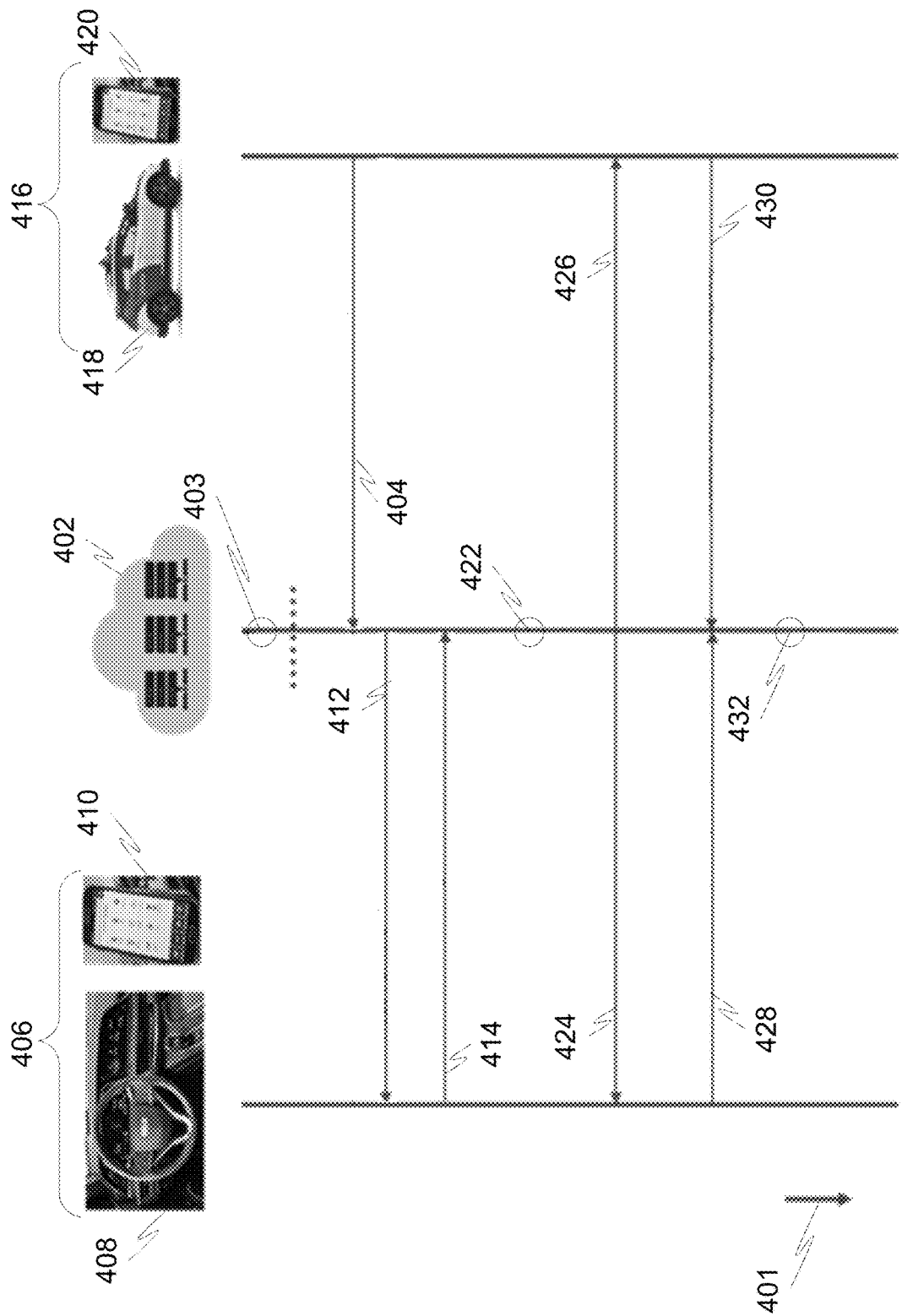
FIG. 4 is a diagram depicting an example timing chart that illustrates example interactions over time between an ODA server, a host vehicle, and a Robo Taxi resulting from a requested change by an occupant of the Robo Taxi after the beginning of a platooning trip, in accordance with various embodiments.

FIG. 4 depicts an example timing chart that illustrates example interactions over time 401 between an ODA server 402, a host vehicle or Fv, and a Robo Taxi or Lv resulting from a requested change by an occupant of the Fv after the beginning 403 of a platooning trip. In this example, an occupant of the Lv or the Lv sends a trip termination request to the ODAS 402 (operation 404). The occupant may send the request via a Robo Taxi ride assistant 406. The Robo Taxi ride assistant 406 may be embodied in a vehicle human machine interface (HMI) 408 in the Lv (e.g., an infotainment system in a Lv) or a mobile app 410 on a user device.

The ODAS 402 broadcasts the information content of the termination request to the Fv for the platooning trip (operation 412) notifying it of the requested termination request. The Fv acknowledges and accepts the termination request (operation 414). The Fv may acknowledge the request via host ride assistant 406 or may acknowledge the request via a built in ODS system module in the Fv. The host ride assistant 406 may be embodied in a vehicle human machine interface (HMI) 408 in the Robo Taxi vehicle (e.g., an infotainment system in a Robo Taxi vehicle) or a mobile app 410 on a user device. Also, shown is a Robo Taxi ride assistant 416, which may be embodied in a vehicle human machine interface (HMI) 418 in the Robo Taxi vehicle (e.g., an infotainment system in a Robo Taxi vehicle) or a mobile app 420 on a user device The ODAS 402 will elect a new leader and compute new rendezvous points, if necessary (operation 422). The ODAS 402 will subsequently communicate revised coupling/decoupling information to the host vehicle (operation 424) and to the current Robo Taxi and newly elected Robo Taxi (operation 426). The subsequent communication will include decoupling instructions for the Fv and current Lv and coupling instructions for the Fv and a new Lv.

After receipt of the subsequent communication, the host vehicle will transmit an acknowledgment accepting or rejecting the coupling/decoupling instructions in the subsequent communication (operation 428), and the newly elected Robo Taxi will transmit an acknowledgment accepting or rejecting the coupling/decoupling instructions in the subsequent communication (operation 430). The ODAS 402 will monitor the trip if the host vehicle and newly elected Robo Taxi accept the coupling instructions or terminate the trip if the host vehicle and newly elected Robo Taxi reject the coupling instructions (operation 432).

Figure 5:
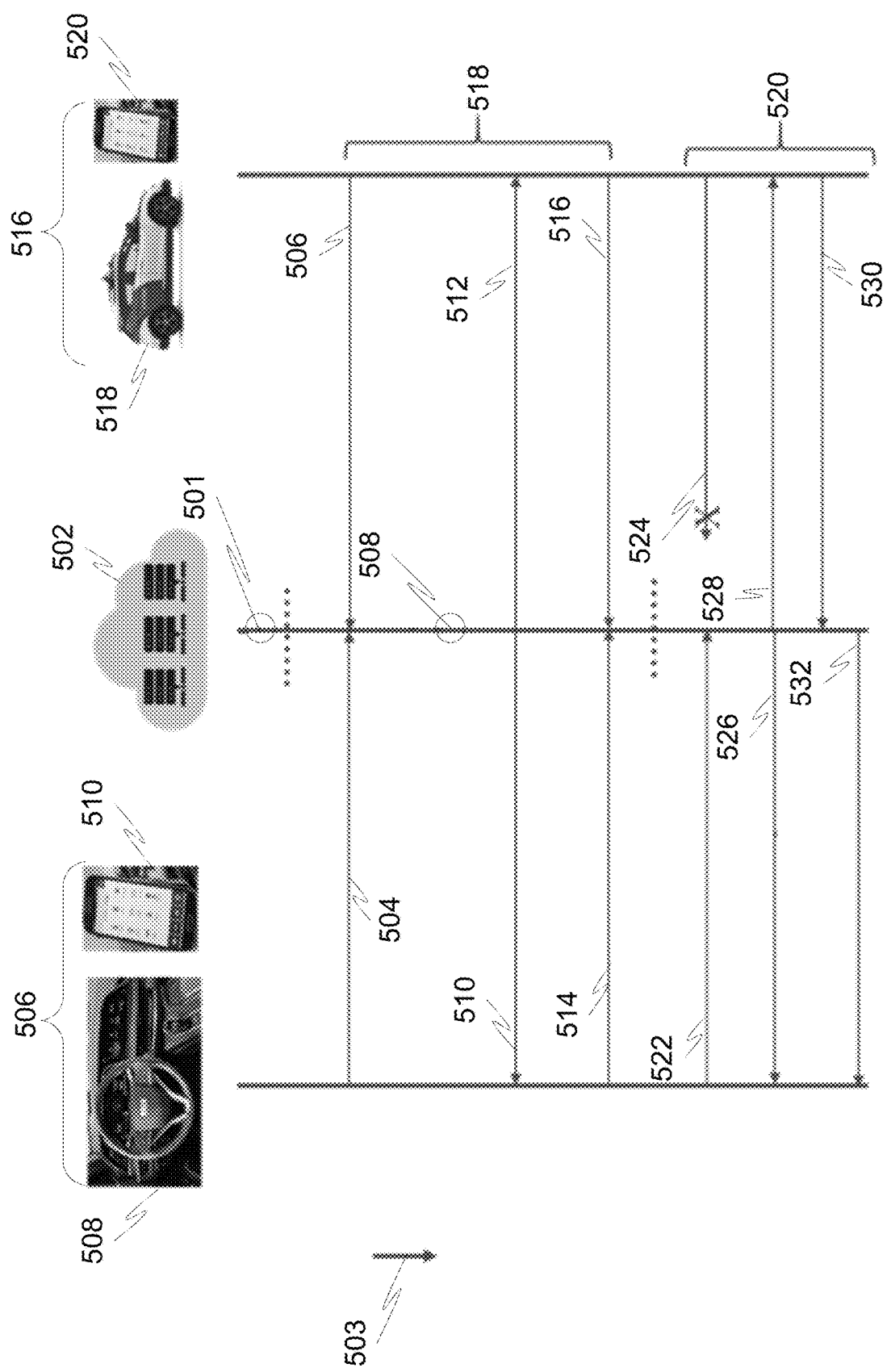
FIG. 5 is a diagram depicting an example timing chart that illustrates example interactions over time between an ODA server, a host vehicle, and a Robo Taxi resulting from various vehicle status alert messages after the beginning of a platooning trip, in accordance with various embodiments.

FIG. 5 depicts an example timing chart that illustrates example interactions over time 501 between an ODA server 502, a host vehicle or Fv, and a Robo Taxi or Lv resulting from various vehicle status alert messages after the beginning 503 of a platooning trip. During a platooning trip both the host vehicle and the Robo Taxi communicate their status to the server 502.

The host vehicle provides a periodic heartbeat message n (operation 504) to report its status, and the Robo Taxi provides a periodic heartbeat message n (operation 506) to report its status. The server 502 analyzes the periodic heartbeat messages from the host vehicle and the Robo Taxi to determine whether a fault condition exists with the host vehicle or the Robo Taxi. When the server 502 detects a fault condition, the server 502 diagnoses the default type, such as a transient coupling interference, and selects a feedback mechanism for alerting the host vehicle and the Robo Taxi regarding the detected fault type (operation 508). The feedback mechanism may be a text alert, voice alert, or a non-verbal alert such as a haptic alert.

In this example, the server 502 provides an alert (e.g., text, voice, and/or non-verbal cue) to the host vehicle (operation 510) notifying the host vehicle of the diagnosed default type and provides an alert (e.g., text, voice, and/or non-verbal cue) to the Robo Taxi (operation 512) notifying the Robo Taxi of the diagnosed default type. When the fault type is an emergency fault type, the server, in this example, provides a nonverbal cue, such as a haptic cue, to the host vehicle and to the Robo Taxi.

Responsive to receiving the alert, the host vehicle provides an acknowledgment heartbeat message n+1 (operation 514). Also, responsive to receiving the alert, the Robo Taxi provides an acknowledgment heartbeat message n+1 (operation 516). These operations are examples of platoon fault handling operations 518 performed by the ODA server 502, the host vehicle, and the Robo Taxi. Thus, the server 502 can monitor for periodic heartbeat messages from the platoon vehicles; when a periodic heartbeat message is received, compute a first result that indicates whether a fault has occurred with the platoon vehicle that sent the heartbeat message and when a fault has occurred provides a diagnosis of the type of fault that has occurred; and when the type of fault has been diagnosed, provide an alert (e.g., voice, text, haptic) to the platoon vehicles alerting them of the diagnosed type of fault.

The ODA server 502, the host vehicle, and the Robo Taxi can also perform communication failure event handling operations 520. When a periodic heartbeat message from one of the host vehicle or the Robo Taxi fails to reach the ODA server 502, the communication failure event handling operations 520 are performed.

In this example, the host vehicle sends a periodic heartbeat message n+x to the server operation 522. The Robo Taxi, however, fails to provide a periodic heartbeat message n+x to the server (operation 524). In response, the server 502 sends an alert to the host vehicle (operation 526) notifying the host vehicle of the missed periodic heartbeat message from the Robo Taxi, and sends a query to the Robo Taxi regarding the health of the Robo Taxi and the coupling health status of the Robo Taxi (operation 528). The Robo Taxi responds with an acknowledgement heartbeat message (operation 530) from which the server 502 can determine the status of the Robo Taxi. The server 502 can then send an alert (e.g., text and/or voice) providing a status update regarding the host vehicle health status and regarding the coupling health status (operation 532).

Thus, the server 502 can monitor for periodic heartbeat messages from the platoon vehicles. When a periodic heartbeat message is not received from one of the plurality of platoon vehicles, the server requests vehicle health status and virtual coupling health status for the platoon vehicle from which the periodic heartbeat message was not received; sends an alert (text/voice/haptic) to the other of the plurality of platoon vehicles that provides notification that the periodic heartbeat message was not received; and when a responsive message is received in response to the request for health status, the server alerts (text/voice) the other of the plurality of platoon vehicles with status information for the platoon vehicle from which the periodic heartbeat message was not received.

Figure 6:
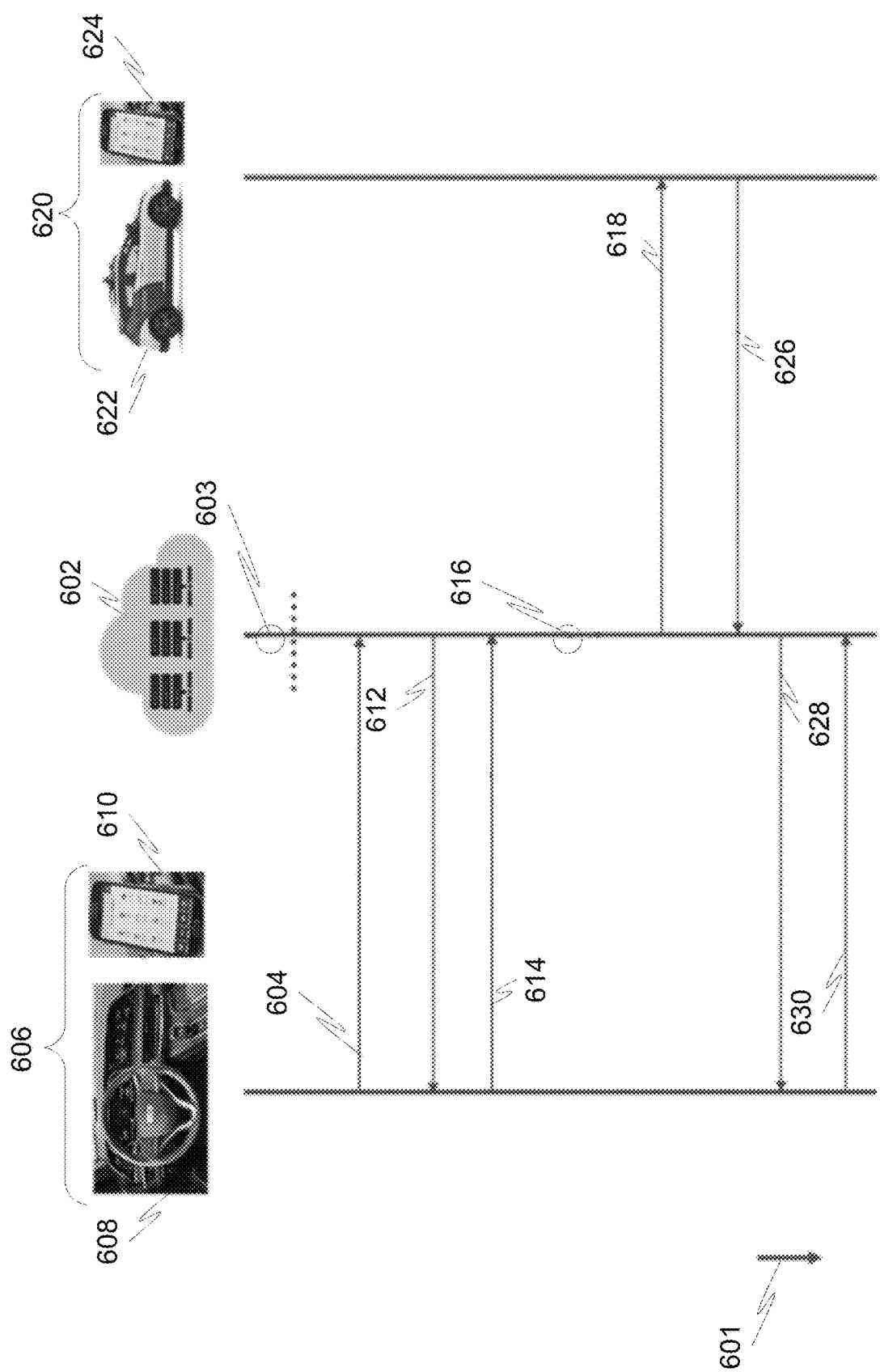
FIG. 6 is diagram depicting an example timing chart that illustrates example interactions over time between an ODA server, a host vehicle, and a Robo Taxi resulting from the occurrence of an occupant safety event after the beginning of a platooning trip, in accordance with various embodiments.

FIG. 6 depicts an example timing chart that illustrates example interactions over time 601 between an ODA server 602, a host vehicle or Fv, and a Robo Taxi or Lv resulting from the occurrence of an occupant safety event after the beginning 603 of a platooning trip. In this example, an in-vehicle occupant or remote user sends a safety alert message to the server 602 (operation 604) via a host ride assistant 606, such as via an in-vehicle infotainment system 608 or a user application 610 from a user device. Alternatively, the host vehicle could sense a safety condition and send a safety alert message to the server 602. For example, the host vehicle may leverage in-vehicle monitoring (e.g., cabin camera) to identify a safety condition.

Responsive to receiving the safety alert message, the server 502 sends a responsive message to the entity (e.g., host ride assistant 606 or host vehicle) that sent the safety alert message seeking further information (operation 612). The host vehicle may leverage in-vehicle communication systems to display the request for further information. The entity that sent the safety alert message can respond by sending a detailed description of the safety condition that necessitated the need to send the safety alert message (operation 614).

Responsive to receiving the detailed description, the server 602 determines and executes an appropriate safety response 616. The safety response may be to call 911, for example, if the safety condition is a health emergency. Other examples of safety responses include having the host vehicle pull over for a physical inspection and others.

The server 602 also sends a safety event response alert to the Robo Taxi advising the Robo Taxi of the safety condition that necessitated the need to send the safety alert message (operation 618). The safety event response alert may be sent to the Robo Taxi ride assistant 620 (e.g., the Robo Taxi infotainment system 622 or a user application 624 on a user device). Alternatively, the safety event response alert may be sent to the Robo Taxi itself. The Robo Taxi may leverage in-vehicle communication systems to display the safety event response alert. Responsive to receiving the safety event response alert, the entity that received the safety event response alert may send an acknowledgement message to the server (operation 626).

The server 602 also sends an alert regarding the safety response to the host vehicle and/or host ride assistant (operation 628). The alert may be in the form of a text alert and/or a voice alert. The host vehicle may leverage in-vehicle communication systems to display the alert. The entity receiving the alert regarding the safety response sends an acknowledgement to the server 602 (operation 630).

Thus, the server 602 can monitor for a safety alert message regarding a platoon vehicle. When a safety alert message is received, the server requests further information regarding the safety condition necessitating the safety alert message. When detailed information further information regarding the safety condition necessitating the safety alert message is received by the server 602, the server 602 calculates a safety event response, causes the safety event response to occur, and sends an event response alert to the leader vehicle which may include signaling the leader vehicle to adjust driving accordingly (e.g., operate conservatively or to pull over). The server 602 can monitor for an acknowledgement from the leader vehicle, broadcast an alert (e.g., voice/text) to the host vehicle and/or host ride assistant 606 regarding the safety event response, and monitor for an acknowledgement from the host vehicle.

In the examples of FIGS. 3-6, a Ride Assistant system comprising a host ride assistant and a Robo Taxi ride assistant, was disclosed. In the examples of FIGS. 3-4, the Ride Assistant system allowed for follower or leader initiated ongoing trip interrupts, such as modifications (e.g., pit stop) and terminations, via a mobile application (offboard) or infotainment system (onboard).

Additionally, the host ride assistant can be configured to allow a host vehicle occupant to select leader(s) at the beginning of a trip and rate leader(s) at the end of the trip. Similarly, the Robo Taxi ride assistant may be configured to allow a Robo Taxi occupant to select follower(s) at the beginning of a trip and rate follower(s) at the end of a trip. For example, the Ride Assistant system via the host ride assistant and the Robo Taxi ride assistant can allow occupants to leave a rating based on comfort and safety at the end of the trip. By providing a mechanism for rating leaders and followers, the host ride assistant can be configured to allow an occupant to accept leader(s) based on ratings, and the Robo Taxi ride assistant can be configured to allow an occupant to accept follower(s) based on ratings.

In the examples of FIGS. 3-6, a robust feedback system was disclosed (e.g., using display/haptic/voice/alert sounds) that can be tapped to communicate with users in a requesting host vehicle or leader vehicle at various stages of service provisioning such as initiation, active, hand-off, and termination.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An On-Demand Autonomy (ODA) system comprising:
   a plurality of platoon vehicles comprising:
   a follower vehicle (Fv) configured to be controlled toward a requested location; and
   a first leader vehicle (Lv) configured to control the Fv toward the requested location;
   a cloud based server (ODAS) comprising a controller for supporting ODA platooning, the controller comprising non-transitory computer readable media and one or more processors configured by programming instructions on the non-transitory computer readable media; and
   the ODAS configured to receive a trip request for ODA platooning service from a first vehicle, seek an agreement to establish a virtual coupling link between the first vehicle and at least one second vehicle, wherein the ODAS is further configured to:
   broadcast the trip request to a plurality of second vehicles;
   receive a set of responses from at least one of the plurality of second vehicles to the broadcast trip request;
   coordinate one or more responses between the first and second vehicles based on results of a matching operation to confirm an acceptance of the agreement and facilitate the establishment of the virtual coupling;
   in response to confirmation of the acceptance of the agreement, create a trip plan for the trip request for the ODA service based on a set of preferences received from the plurality of platoon vehicles, wherein the first vehicle is the Fv and the second vehicle is the first Lv;
   monitor the Fv and the first Lv during the platooning trip for information comprising trip termination request, trip modification request, platooning status, vehicle health status, virtual coupling health status and safety information;
   communicate and broadcast the information comprising platooning status, vehicle health status, virtual coupling health status, and safety information to the platoon vehicles;
   monitor for periodic heartbeat messages from the platoon vehicles, and compute a first result upon receipt of each heartbeat message to determine whether a fault has occurred with the vehicle that sent the message;
   upon detecting a fault, diagnose a fault type;
   select a feedback mechanism from one or more options comprising voice, text, and non-verbal cue; and
   signal the platoon vehicles using the selected feedback mechanism with an alert message identifying the fault type.

2. The system of claim 1, wherein the ODAS is further configured to:
   provide decoupling instructions for the Fv and first Lv responsive to receipt of the Fv trip termination request;
   broadcast information regarding the trip termination request to the plurality of platoon vehicles including the Lv; and
   monitor for an acknowledgement and acceptance of the trip termination request from the Lv, wherein the Lv stops controlling the Fv toward the requested location responsive to the broadcast information regarding the trip termination request.

3. The system of claim 1, wherein the ODAS is further configured to:
   provide decoupling instructions for the Fv and first Lv and coupling instructions for the Fv and a second Lv responsive to receipt of the Fv trip modification request;
   broadcast information regarding the trip modification request to the first Lv;
   monitor for a first Lv acknowledgement of the trip modification request, elect the second Lv, compute a rendezvous point at which the second Lv will begin to lead the Fv, and signal the Fv and the second Lv that the second Lv will take over as the leader for the platooning trip at the rendezvous point; and monitor for an acknowledgement that indicates acceptance of the second Lv as the leader for the platooning trip at the rendezvous point, wherein the second Lv controls the Fv toward the requested location and the first Lv stops controlling the Fv.

4. The system of claim 3, wherein the ODAS is further configured to:
consistently monitor the platooning trip for information comprising trip termination request, trip modification request, platooning status, vehicle health status, virtual coupling health status and safety information;
communicate and broadcast the information to the platoon vehicles;
monitor for periodic heartbeat messages from the platoon vehicles, and compute a first result upon receipt of each heartbeat message to determine whether a fault has occurred in the vehicle that sent the message;
upon detecting a fault, diagnose the fault type; and
select a feedback mechanism from one or more feedback options, and signal the platoon vehicles with an alert message identifying the fault type.

5. The system of claim 1, wherein the ODAS is further configured to:
provide decoupling instructions for the Fv and first Lv responsive to receipt of the first Lv trip termination request; and
elect a second Lv, compute a rendezvous point at which the second Lv will begin to lead the Fv, and signal the Fv and second Lv that the second Lv will take over as the leader for the platooning trip at the rendezvous point;
wherein the second Lv controls the Fv toward the requested location and the first Lv stops controlling the Fv.

6. The system of claim 1, wherein the ODAS is further configured to monitor for a subsequent periodic heartbeat message from each of the plurality of platoon vehicles that acknowledges receipt of the alert message that identifies the diagnosed type of fault.

7. The system of claim 1, wherein the ODAS is further configured to:
when a periodic heartbeat message is not received from one of the plurality of platoon vehicles, query the platoon vehicle from which the periodic heartbeat message was not received regarding vehicle health status and virtual coupling health status;
select a feedback mechanism from one or more options comprising voice, text, and non-verbal cue, and signal using the selected feedback mechanism to other of the plurality of platoon vehicles an alert message that provides notification that the periodic heartbeat message was not received; and
when a responsive message to the query is received, signal the other of the plurality of platoon vehicles with status information regarding the platoon vehicle from which the periodic heartbeat message was not received.

8. The system of claim 1, wherein the ODAS is further configured to
when a safety alert message regarding the Fv is received, request further information from a message sender;
when further information is received, calculate a second result comprising a safety event response, cause the safety response to occur, and signal the first Lv that a safety alert message was received and to adjust driving accordingly;
monitor for an acknowledgement from the first Lv after signaling the first Lv that a safety alert message was received;
broadcast an alert regarding the safety event response to the Fv; and
monitor for an acknowledgement from the Fv.

9. The system of claim 1, wherein the virtual coupling enables the first Lv to control and command the Fv toward the requested location during a platooning trip, and is further configured to allow future vehicle maneuvers to be communicated ahead of time to allow the platoon vehicles to accelerate or brake simultaneously.

10. A method in an On-Demand Autonomy (ODA) system comprising a follower vehicle (Fv), a first leader vehicle (Lv), and a cloud based server (ODAS), the method comprising:
receiving by the ODAS a trip request for ODA service from a first vehicle;
seeking by the ODAS an agreement to establish a virtual coupling link between the first vehicle and at least one second vehicle, wherein seeking an agreement comprises:
broadcasting the trip request to a plurality of second vehicles;
receiving a set of responses from at least one of the plurality of second vehicles to the broadcast trip request; and
coordinating one or more responses between the first and second vehicles based on results of a matching operation to confirm an acceptance of the agreement and facilitate the establishment of the virtual coupling;
in response to confirmation of the acceptance of the agreement, creating a trip plan for the ODA service based on a set of preferences received from a plurality of platoon vehicles, wherein the first vehicle is the Fv and the second vehicle is the first Lv;
monitoring, by the ODAS, the Fv and the first Lv during the platooning trip for information comprising a trip termination request, a trip modification request, platooning status, vehicle health status, virtual coupling health status and safety information;
communicating and broadcasting, by the ODAS, the information comprising platooning status, vehicle health status, virtual coupling health status, and safety information to the platooned vehicles;
monitoring, by the ODAS, for periodic heartbeat messages from the platooned vehicles, and computing a first result upon receipt of each heartbeat message to determine whether a fault has occurred with the vehicle that sent the message;
upon detecting a fault, diagnosing, by the ODAS, a fault type;
selecting, by the ODAS, a feedback mechanism from one or more options comprising voice, text, and non-verbal cue; and
signaling the platoon vehicles, by the ODAS, using the selected feedback mechanism with an alert message identifying the fault type.

11. The method of claim 10, further comprising:
providing decoupling instructions for the Fv and first Lv responsive to receipt of the Fv trip termination request; and broadcasting, by the ODAS, information regarding the trip termination request to the plurality of platoon vehicles including the Lv, and monitoring for an acknowledgment and acceptance of the trip termination request from the Lv, wherein the Lv stops controlling the Fv responsive to the broadcast information regarding the trip termination request.

12. The method of claim 11, further comprising:
providing, by the ODAS, decoupling instructions for the Fv and first Lv responsive to receipt of a first Lv trip modification request and coupling instructions for the Fv and a second Lv responsive to receipt of the Fv trip modification request;
broadcasting, by the ODAS, information regarding the trip modification request to the first Lv, monitoring for the first Lv acknowledgement of the trip modification request, electing the second Lv, computing a rendezvous point at which the second Lv will begin to lead the Fv, and signaling the Fv and the second Lv that a third Lv will take over as the leader for the platooning trip at the rendezvous point; and
monitoring, by the ODAS, for an acknowledgement that indicates acceptance of the second Lv as the leader for the platooning trip at the rendezvous point, wherein the second Lv controls the Fv toward a requested location and the first Lv stops controlling the Fv.

13. The method of claim 12, further comprising:
consistently monitoring, by the ODAS, the platooning trip for information comprising trip termination request, trip modification request, platooning status, vehicle health status, virtual coupling health status and safety information;
communicating and broadcasting, by the ODAS, the information to the platoon vehicles;
monitoring, by the ODAS. for periodic heartbeat messages from the platoon vehicles, and compute a first result upon receipt of each heartbeat message to determine whether a fault has occurred in the vehicle that sent the message;
upon detecting a fault, diagnosing, by the ODAS, the fault type;
selecting, by the ODAS, a feedback mechanism from one or more feedback options comprising voice, text, and non-verbal cue; and
signaling the platoon vehicles with an alert message identifying the fault type.

14. The method of claim 10, further comprising monitoring for a subsequent periodic heartbeat message from each of the plurality of platoon vehicles that acknowledges receipt of the alert message that identifies the diagnosed type of fault.

15. The method of claim 10, further comprising:
when a periodic heartbeat message is not received from one of the plurality of platoon vehicles, querying the platoon vehicle from which the periodic heartbeat message was not received regarding vehicle health status and virtual coupling health status;
selecting a feedback mechanism and signaling using the selected feedback mechanism to other of the plurality of platoon vehicles an alert message that provides notification that the periodic heartbeat message was not received; and
when a responsive message to the querying is received, signaling the other of the plurality of platoon vehicles with status information regarding the platoon vehicle from which the periodic heartbeat message was not received.

16. The method of claim 10, further comprising:
when a safety alert message regarding the Fv is received, requesting further information from a message sender;
when further information is received, calculating a second result comprising a safety event response, causing the safety response to occur, and signaling the Lv that a safety alert message was received and to adjust driving accordingly;
monitoring for an acknowledgement from the Lv after signaling the Lv that a safety alert message was received;
broadcasting an alert regarding the safety event response to the Fv; and
monitoring for an acknowledgement from the Fv.

17. A method in an On-Demand Autonomy (ODA) system comprising a follower vehicle (Fv), a first leader vehicle (Lv), and a cloud based server (ODAS), the method comprising:
receiving by the ODAS a trip request for ODA service from a first vehicle;
seeking by the ODAS an agreement to establish a virtual link between the first vehicle and at least one second vehicle, wherein seeking an agreement comprises:
broadcasting the trip request to a plurality of second vehicles;
receiving a set of responses from at least one of the plurality of second vehicles to the broadcast trip request; and
coordinating one or more responses between the first and second vehicles based on results of a matching operation to confirm an acceptance of the agreement and facilitate the establishment of a virtual coupling;
in response to confirmation of the acceptance of the agreement, creating a trip plan for the ODA service based on a set of preferences received from a plurality of platoon vehicles, wherein the first vehicle is the Fv and the second vehicle is the first Lv;
monitoring by the ODAS the Fv and the first Lv during the platooning trip for information comprising trip termination request, trip modification request, platooning status, vehicle health status, virtual coupling health status and safety information;
communicating and broadcasting, by the ODAS, the information comprising platooning status, vehicle health status, virtual coupling health status, and safety information to the platooned vehicles;
monitoring, by the ODAS, for periodic heartbeat messages from the platooned vehicles, and computing a first result upon receipt of each heartbeat message to determine whether a fault has occurred with the vehicle that sent the message;
upon detecting a fault, diagnosing, by the ODAS, a fault type;
selecting, by the ODAS, a feedback mechanism from one or more options comprising voice, text, and non-verbal cue; and
signaling the platoon vehicles, by the ODAS, using the selected feedback mechanism with an alert message identifying the fault type;
wherein the method further comprising:
providing decoupling instructions for the Fv and first Lv and coupling instructions for the Fv and a second Lv responsive to receipt of the Fv trip modification request;
broadcasting, by the ODAS, information regarding the trip modification request to the first Lv, monitoring for first Lv acknowledgement of the trip modification request, electing the second Lv as the leader for the platooning trip, computing a rendezvous point at which the second Lv will begin to lead the Fv, and signaling the Fv and the second Lv that the second Lv will take over as the leader for the platooning trip at the rendezvous point; and monitoring, by the ODAS, for an acknowledgement that indicates acceptance of the second Lv as the leader for the platooning trip at the rendezvous point, wherein the second Lv controls the Fv toward a requested location and the first Lv stops controlling the Fv.

18. The method of claim 17, further comprising:

providing decoupling instructions for the Fv and at least one Lv responsive to receipt of the Fv trip termination request; and broadcasting, by the ODAS, information regarding the trip termination request to the plurality of platoon vehicles, and monitoring for an acknowledgment and acceptance of the trip termination request from the Lv, wherein the Lv stops controlling the Fv toward the requested location responsive to the broadcast information regarding the trip termination request.

19. The method of claim 17, further comprising:

monitoring for periodic heartbeat messages from the plurality of platoon vehicles;

when a periodic heartbeat message is received, computing a first result that indicates whether a fault has occurred with the platoon vehicle that sent the heartbeat message and when a fault has occurred diagnose a fault type of the fault that has occurred; and when the fault type has been diagnosed, selecting a feedback mechanism and signaling using the selected feedback mechanism the Fv and the Lv with an alert message that identifies the diagnosed type of fault.

20. The method of claim 19, further comprising:

when a periodic heartbeat message is not received from one of the plurality of platoon vehicles, querying the platoon vehicle from which the periodic heartbeat message was not received regarding vehicle health status and virtual coupling health status;

selecting a feedback mechanism and signaling using the selected feedback mechanism to other of the plurality of platoon vehicles an alert message that provides notification that the periodic heartbeat message was not received; and when a responsive message to the querying is received, signaling the other of the plurality of platoon vehicles with status information regarding the platoon vehicle from which the periodic heartbeat message was not received.

\* \* \* \* \*